(12) United States Patent
Masuda

(10) Patent No.: US 9,886,227 B2
(45) Date of Patent: Feb. 6, 2018

(54) COMPUTER, PRINT CONTROL METHOD, AND NETWORKED SYSTEM

(71) Applicant: Yusaku Masuda, Tokyo (JP)

(72) Inventor: Yusaku Masuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/348,156

(22) Filed: Nov. 10, 2016

(65) Prior Publication Data

US 2017/0161000 A1 Jun. 8, 2017

(30) Foreign Application Priority Data

Dec. 3, 2015 (EP) .................................... 15197829

(51) Int. Cl.
*G06F 3/12* (2006.01)
*H04N 1/00* (2006.01)

(52) U.S. Cl.
CPC .......... *G06F 3/1288* (2013.01); *G06F 3/1203* (2013.01); *G06F 3/1211* (2013.01); *G06F 3/1224* (2013.01); *G06F 3/1236* (2013.01); *G06F 3/1238* (2013.01); *H04N 1/00244* (2013.01); *H04N 1/00408* (2013.01); *H04N 2201/0094* (2013.01)

(58) Field of Classification Search
CPC .... G06F 3/1263; G06F 3/1285; G06F 1/3203; G06F 1/3287; G06F 3/1204; G06F 3/1208; G06F 3/1221; G06F 3/1275; G06F 3/1286; G06F 3/1205; G06F 3/122; G06F 3/1244; G06F 3/1253; G06F 3/126
USPC ............. 358/1.15, 1.14, 1.1, 1.12, 1.2, 296; 399/403, 405, 82, 85; 707/999.202, 707/999.205; 710/1, 33, 62, 72; 715/200, 201, 202, 203, 255
See application file for complete search history.

(56) References Cited

U.S. PATENT DOCUMENTS

| 5,467,434 | A | * | 11/1995 | Hower, Jr. | ............ | G06F 3/1205 |
| | | | | | | 358/1.13 |
| 6,717,690 | B1 | * | 4/2004 | Salgado | ............ | H04N 1/00915 |
| | | | | | | 358/1.14 |
| 7,170,623 | B2 | * | 1/2007 | Matoba | .................. | G06F 3/1288 |
| | | | | | | 358/1.15 |

(Continued)

OTHER PUBLICATIONS

Extended European Search Report dated Jun. 14, 2016 in Patent Application No. 15197829.3, filed on Dec. 3, 2015 (with Written Opinion).

*Primary Examiner* — Negussie Worku
(74) *Attorney, Agent, or Firm* — Oblon, McClelland, Maier & Neustadt, L.L.P.

(57) ABSTRACT

A computer includes a processor and a memory containing a program executable by the processor. The computer is connected to a network, which is also connected to an image forming device and an external system configured to generate external print jobs. The code is configured to maintain a local print queue including local print jobs based on content generated by another computer program executed by the computer; receive a request for a job list from the image forming device; send a request for a list of the external print jobs to the external system; receive a list of the external print jobs from the external system; merge the list of the external print jobs with a list of the local print jobs in the local print queue to form a combined job list; and send the combined job list to the image forming apparatus.

8 Claims, 5 Drawing Sheets

(56) References Cited

U.S. PATENT DOCUMENTS

| | | | | |
|---|---|---|---|---|
| 7,256,901 | B2* | 8/2007 | Ferlitsch | G06F 3/1204 345/502 |
| 7,742,185 | B2* | 6/2010 | Lofthus | H04N 1/00954 358/1.15 |
| 2002/0154335 | A1* | 10/2002 | Matoba | G06Q 10/10 358/1.15 |
| 2006/0178917 | A1* | 8/2006 | Merriam | G06Q 10/06312 705/7.22 |
| 2006/0193006 | A1* | 8/2006 | Lawrence | G06F 3/1206 358/1.16 |
| 2008/0055639 | A1* | 3/2008 | Negishi | G03G 15/6573 358/1.15 |
| 2008/0158574 | A1* | 7/2008 | Sugiyama | H04N 1/00885 358/1.1 |
| 2009/0009802 | A1 | 1/2009 | Shaw et al. | |
| 2010/0328704 | A1* | 12/2010 | Feng | G06F 3/1262 358/1.15 |
| 2012/0218600 | A1 | 8/2012 | Shaw et al. | |
| 2013/0003105 | A1* | 1/2013 | Yamada | G06K 15/1859 358/1.14 |
| 2013/0056748 | A1* | 3/2013 | Matsui | H01L 33/22 257/76 |
| 2013/0188221 | A1* | 7/2013 | Ohno | G06F 3/1296 358/1.15 |
| 2014/0376043 | A1* | 12/2014 | Tsujita | G06K 15/002 358/1.15 |
| 2015/0212763 | A1* | 7/2015 | Sharpe | G06F 3/126 358/1.15 |
| 2017/0094119 | A1* | 3/2017 | Fukasawa | H04N 1/4413 |

\* cited by examiner

US 9,886,227 B2

COMPUTER, PRINT CONTROL METHOD, AND NETWORKED SYSTEM

CROSS-REFERENCE TO APPLICATIONS

The present application claims priority under 35 U.S.C. § 119 to European Patent Application No. 15197829.3, filed Dec. 3, 2015, the contents of which are incorporated herein by reference in their entirety.

BACKGROUND

1. Technical Field

The present invention relates to a print control method in a networked image forming system.

2. Description of the Related Art

In large organisations it is common to provide many image forming apparatuses (e.g. multi-function peripherals), that are connected to a network, for use by multiple users. Such an approach is often more economical than providing separate printers for each user, especially if advanced functions—such as double-sided printing, colour and finishing functions—are desired. When the first such systems were introduced, the user would designate which image forming apparatus would be used at the time of sending a document to print. However, this is not always convenient.

In an alternative approach, the user adds a document to be printed to a print queue, without specifying a specific image forming apparatus. The print queue is treated by the operating system of the user's PC as a virtual printer so that the user can select it when printing from any application running on his PC. Then, when the user wants to print the document, the user goes to a networked image forming device and identifies himself, e.g. using a username and PIN or password or a token such as a swipe card or RFID. The image forming apparatus obtains a list of the documents in the print queue belonging to the user. The list is displayed to the user who selects the documents to be printed and the image forming apparatus prints the selected documents.

The above system works well for print jobs generated by applications running in the user's own PC. However, a large organisation may well have some enterprise applications which are run on central mainframe computers. Enterprise applications may perform vital functions for the organisation, for example transaction processes such as invoice generation and management of large databases. Enterprise applications are often specific to the organisation concerned and may represent very large investments in programming and development. Often enterprise applications rely on outdated programming languages, operating systems or hardware so that development of the applications is particularly hard. Such enterprise applications are often referred to as legacy applications.

A particular issue with many enterprise applications is that they have their own individual processes for data output, in particular for printing. Print outputs from many enterprise applications cannot be included in the user-centric centralised print queue systems described above. This is inconvenient for users.

It is an aim of the present invention to at least partially solve one or more of the above problems and provide improved user convenience for printing from enterprise systems.

SUMMARY

According to an embodiment of the present invention, there is provided a print control program comprising code to be executed by a computer connected to a network, which is also connected to an image forming device and an external system configured to generate external print jobs, the code being configured to: maintain a local print queue including local print jobs based on content generated by another computer program executed by the computer; receive a request for a job list from the image forming device; send a request for a list of the external print jobs to the external system; receive a list of the external print jobs from the external system; merge the list of the external print jobs with a list of the local print jobs in the local print queue to form a combined job list; and send the combined job list to the image forming apparatus.

According to an embodiment of the present invention, there is provided a print control method for use in a networked system comprising a computer, an image forming device and an external system configured to generate external print jobs, the method comprising: the computer maintaining a local print queue including local print jobs based on content generated by another computer program executed by the computer; the image forming device sending a request for a job list to the computer; the computer sending a request for a list of the external print jobs to the external system; the external system sending a list of the external print jobs to the computer; the computer merging the list of the external print jobs with a list of the local print jobs in the local print queue to form a combined job list; and the computer sending the combined job list to the image forming apparatus.

BRIEF DESCRIPTION OF THE DRAWINGS

Exemplary embodiments of the invention are described below with reference to the accompanying drawings, in which.

DETAILED DESCRIPTION OF EMBODIMENTS

Figure 1:
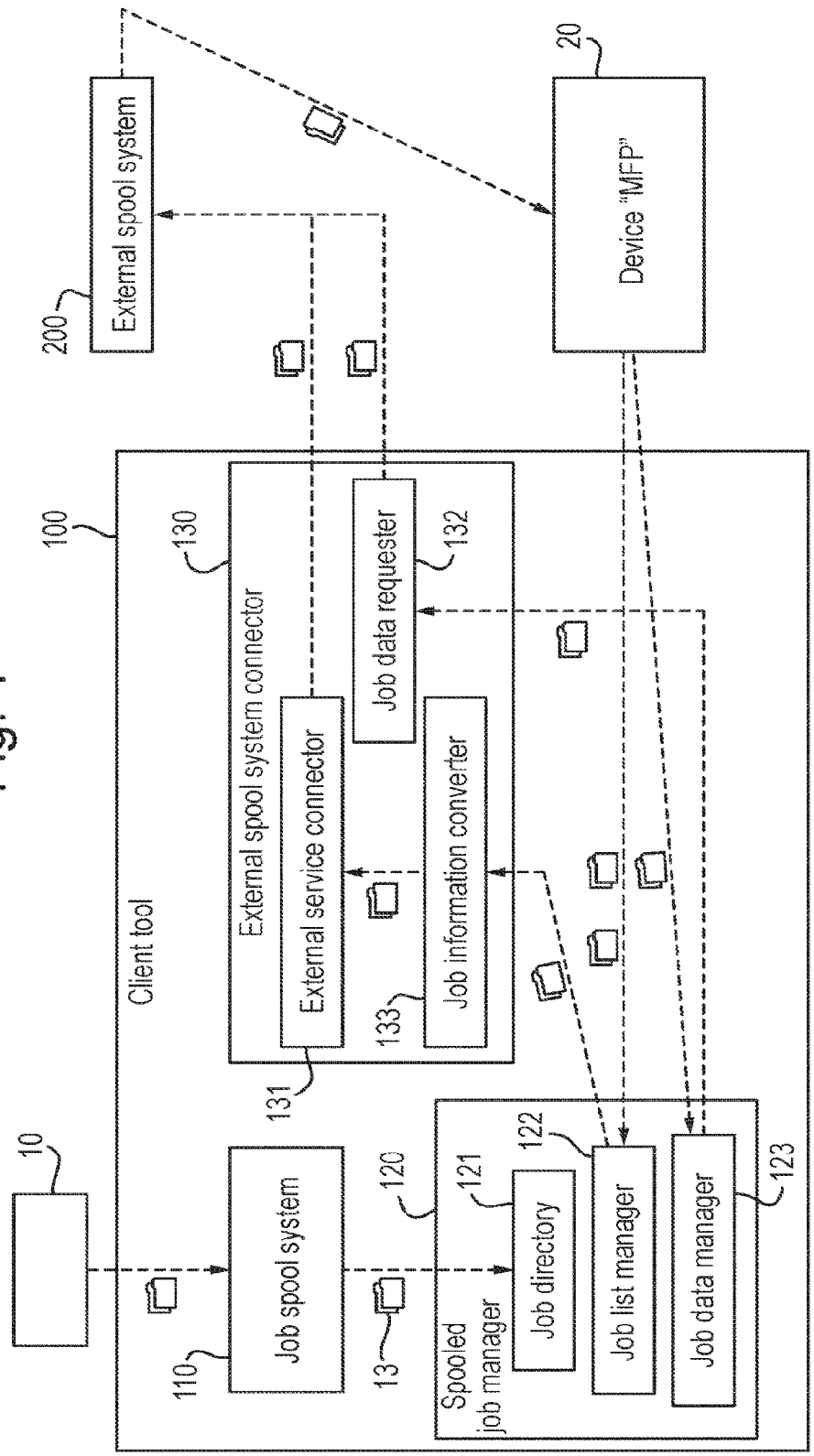
FIG. 1 is a schematic drawing of part of a networked system according to an embodiment of the invention.
Figure 2:
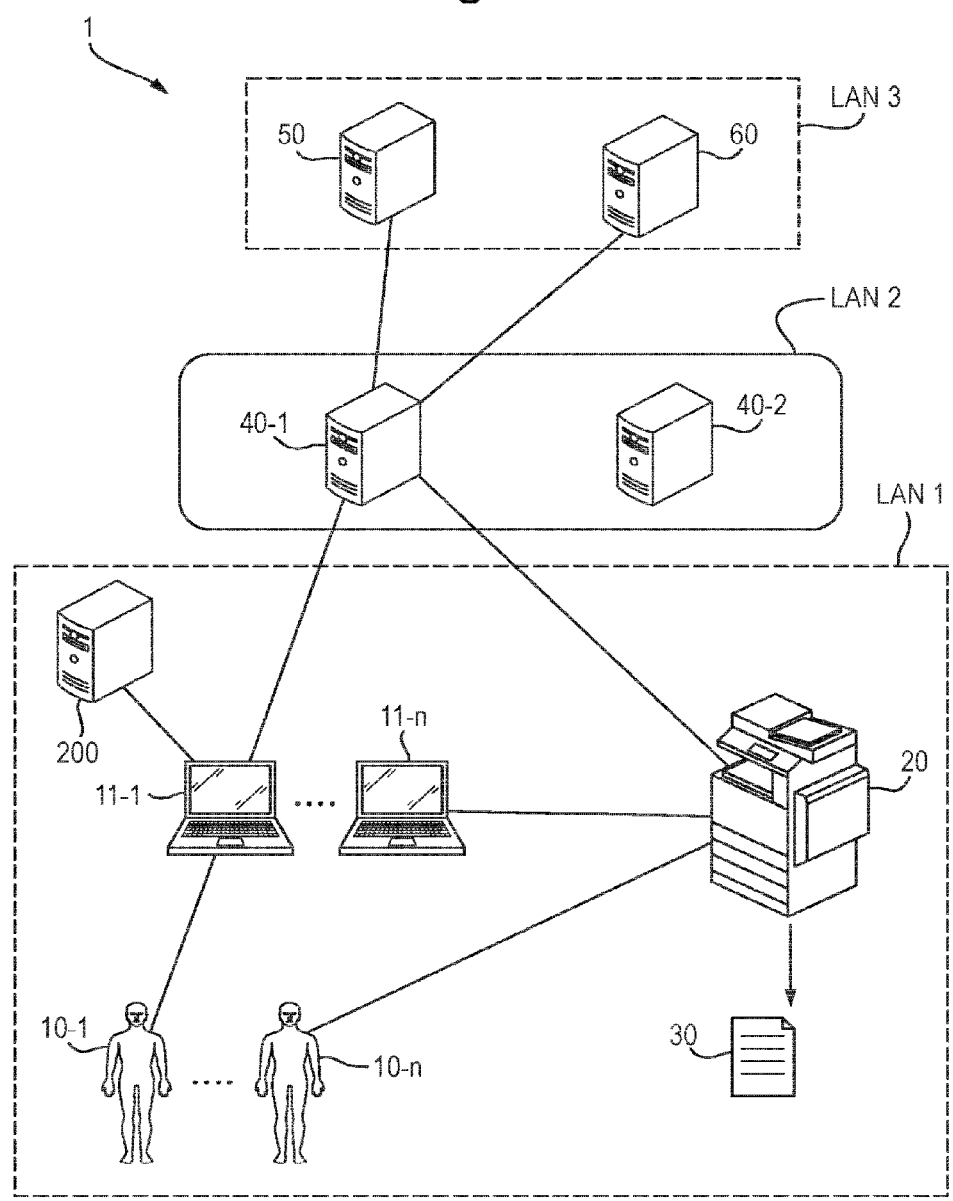
FIG. 2 is a schematic drawing of a networked system according to an embodiment of the invention.

A networked image forming system 1 according to an embodiment of the invention is depicted schematically in FIGS. 1 and 2. A plurality of user computers 11-1 to 11-*n* are connected to a first local area network LAN1 and operated by a plurality of users 10-1 to 10-*m*. The number of users 10 need not be equal to the number of user computers 11. The user computers 11 can include desktop and laptop computers, tablets, smartphones, virtual machines and other computing devices capable of generating a print job. The user computers may operate using any convenient operating system such as Windows®, iOS or Linux.

The first local area network LAN1 may be based on wired or wireless technologies, or a combination of both and can operate using any suitable protocol such as Ethernet (IEEE 802.3) and/or Wi-Fi (IEEE 802.11). A user computer 11 includes a print control program acting as a client tool 100 that manages a print queue and is described further below.

User computer 11 also includes one or more local applications which are configured to generate a print job 13 in response to a user command or as a result of an automated process. A print job is a file containing instructions to print something, for example all or part of a document, a screenshot or the output of a program. A document can be, for example, a text document, a picture, a spreadsheet, a report, or a multi-media document in any convenient format. A print job can also be in any convenient format, such as for example Postscript® or page description language (PDL) and may include data of the content to be printed in the original document format or rendered (e.g. rasterised) data. The local application can be a word processing program, a spreadsheet program, a presentation program, an image editor, a desktop publishing program, etc. The embodiments of the present invention can be used with any application capable of generating a print job.

An image forming device 20 is also connected to the first local area network LAN1 and is able to print a print job 13. Image forming device 20 may be, for example, a multi-function peripheral (MFP) capable of one or more additional functions, such as scanning, copying or faxing, as well as printing. Image forming device 20 has a print engine to create printed output 30 on media such as paper, transparencies, envelopes, etc. The print engine may operate according to any convenient printing technique, such as xerography, inkjet printing, bubble jet printing, etc. There may be multiple image forming devices 20 of various forms connected to the first local area network LAN1.

The first local area network LAN1 is connected to a second local area network LAN2 via a wide area network (WAN) such as the Internet. First local area network LAN1 and second local area network LAN2 may be connected via a virtual private network (VPN). An authentication server 40-1 is provided in the second local area network LAN2 and provides authentication services for an organisation. Authentication may be required, for example, when a user logs onto a user computer, connects a user computer to the first local area network LAN1, or accesses a network resource, such as image forming device 20.

In a large organisation having many sites and/or large sites, the users may be divided up amongst many different local area networks, due to physical restrictions on network size and/or limits on the number of users per network. Providing an authentication server per network therefore means that there must be many authentication servers, increasing the maintenance burden and making synchronisation of data between the authentication servers burdensome. It is generally desirable that users be able to log onto and use resources of any network in their organisation. Therefore it is desirable that the number of authentication servers 40 be kept to a minimum and so an authentication server 40 may provide authentication services to users and resources connected to multiple different local area networks, which may be physically remote from one-another. Nevertheless, a backup authentication server 40-2 can be provided as a fail-over used in the event of a failure of the authenticated server 40-1.

Authentication server 40-1 may communicate with other servers, for example a directory server 50 and a database server 60. Directory server, for example an LDAP server, may store a hierarchical directory of users, including information such as user IDs, real names, hashed passwords and access rights. Database server 60, for example an SQL server, may store data recording users' usage of the network and its resources. The usage data may be used for accounting purposes and/or for tracking the consumption of consumables such as paper, ink or toner.

For the same reasons as with the authentication server, an organisation may desire to reduce the number of directory servers 50 and database servers 60 it maintains. Hence the directory server 50 and database server 60 may be located in one or more third local area networks LAN3. They can also be located in the same local area network as the authentication server 40.

An external system 200 is also connected to one of the local area networks, e.g. LAN1. External system 200 operates one or more external applications which are capable of creating print jobs either in response to a user instruction or automatically, e.g. in response to a trigger event or according to a schedule. The external application may be an enterprise application, for example a database manager, a report server, an accounting system, etc. A user may interact with the external application via a browser application running on the user PC or a dedicated terminal application running on the user PC 11. A user with the correct privileges can print data from the external application executed by the external system 200.

It should be noted that whilst the present invention is described in relation to a system which is connected to multiple local area networks, the invention can also be applied in a system in which all components are connected to the same network, be that a local area network, a wide area network, wired or wireless.

The process of printing in an embodiment of the invention will now be described in more detail with reference to FIGS. 3 to 5.

Figure 3:
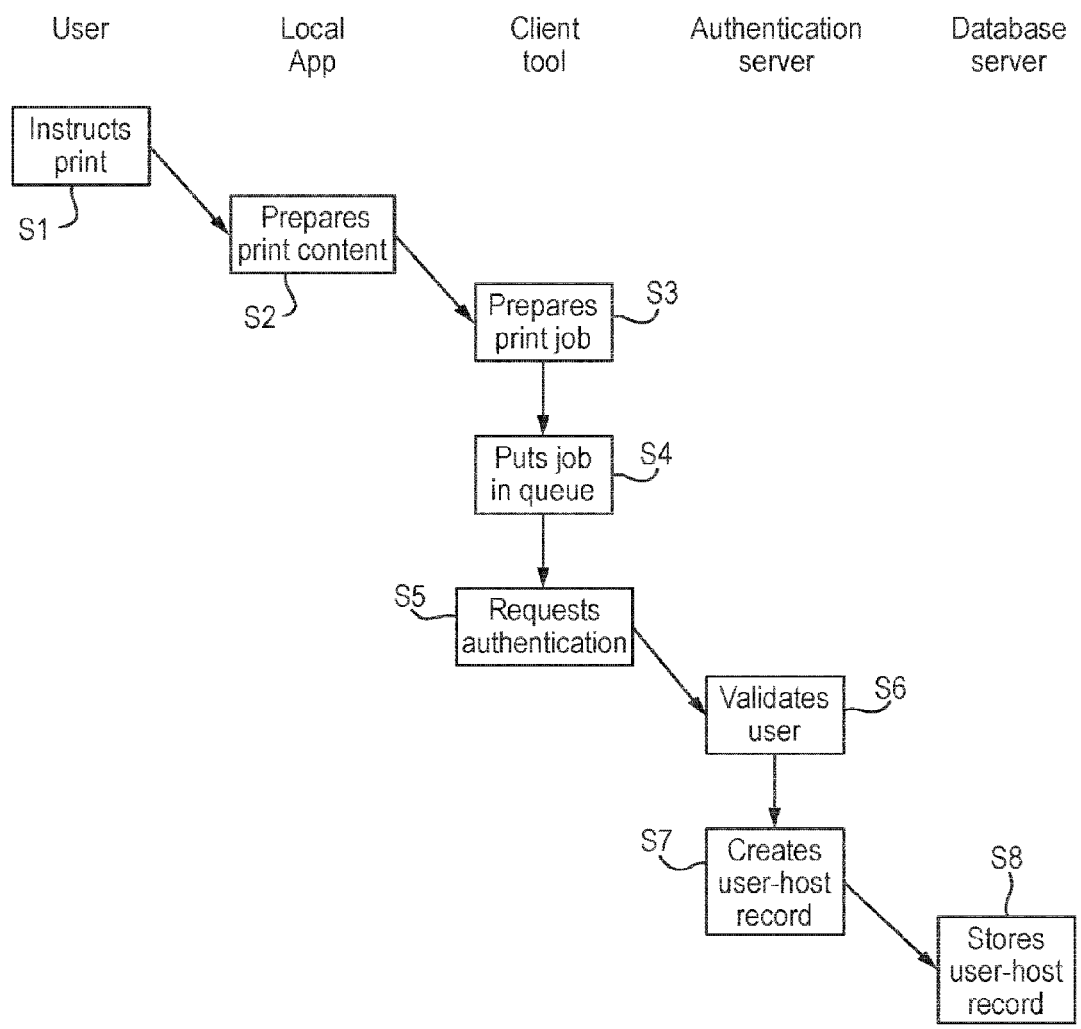
FIG. 3 is a flow chart of a process to generate a print job from output of a local application on a user PC.

As shown in FIG. 3, when a user 10 wishes to print a document, for example, he/she issues a print instruction S1 in the relevant application or via the operating system of his/her user computer 11. The user may be prompted to select options for printing—such as scaling, duplex printing or finishing—or default options may be applied. The user may be provided with the option to select a specific device to print the document, e.g. a printer connected directly to the user computer or a network printer. A print service according to an embodiment of the invention may be presented to the user as an option to be selected instead of a specific physical printer. The print service may be presented to the user and treated by the operating system as a virtual printer that is equivalent to a physical printer. In an embodiment, the print service is selected by default.

The content to be printed is prepared S2 by the application or operating system and delivered to a client tool, e.g. in the form of a printer driver associated with the print service. A job spool system 110 converts S3 the content to a print job 13, for example defined in page description language (PDL). The print job is then passed to spooled job manager 120 which manages the print queue which may contain multiple print jobs. The print job 13 is entered S4 into a print queue. The print queue is stored in the user computer 11, e.g. in a non-volatile mass storage device such as a hard disk or a solid state drive.

Next, the client tool 100 requests authentication S5 from authentication server 40 and registers with it. Communication between the printer driver (and other elements of the system) and authentication server can be performed using any suitable protocol, such as HTTP or HTTPs. SLS or TLS encryption can be employed. In the registration procedure, client tool 100 provides information identifying the user 10 who has instructed printing, e.g. by providing a user ID and a hashed password. The authentication server 40 determines whether the user ID and password are valid S6 and optionally whether the user has necessary privileges to use the print service. User privileges may entitle a user to use all functions of the print service or only some. Authentication server 40 may look-up the user's record in directory server 50 in order to determine the user's privileges or other information. User privileges may be inferred from other information stored about the user, e.g. membership of groups, rather than stored explicitly. If the user does not have the necessary privileges an error message is sent to the client tool 100.

If the user does have the necessary privileges, the authentication server creates and sends S7 a user-host record indicating that the user has a print job 131 in the print queue 13 maintained by client tool 100 on user computer 11 to database server 60. The user-host record includes an address, e.g. a hostname and/or an IP address, of the user computer 11. A user may use more than one computer and accordingly the database server 60 may store multiple user-host records linking a user with multiple user computers 11.

Figure 4:
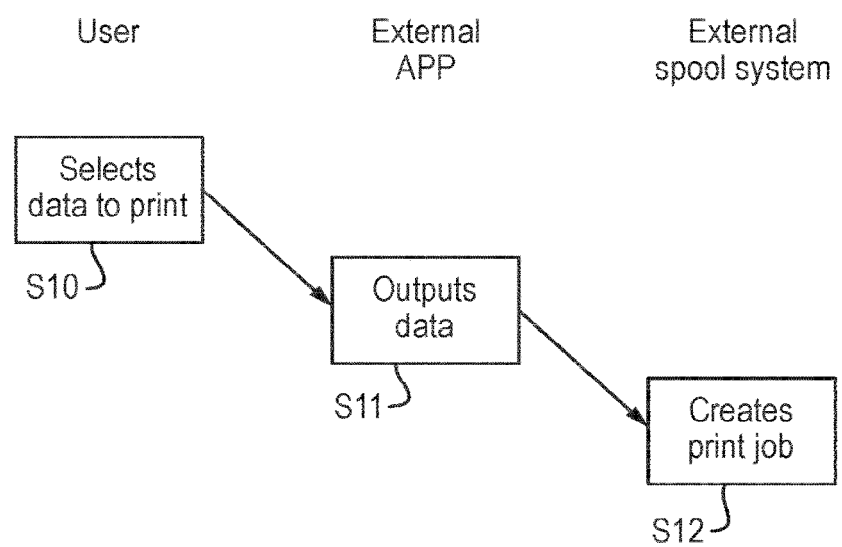
FIG. 4 is a flow chart of a process to generate a print job from output of an external application.
Figure 5:
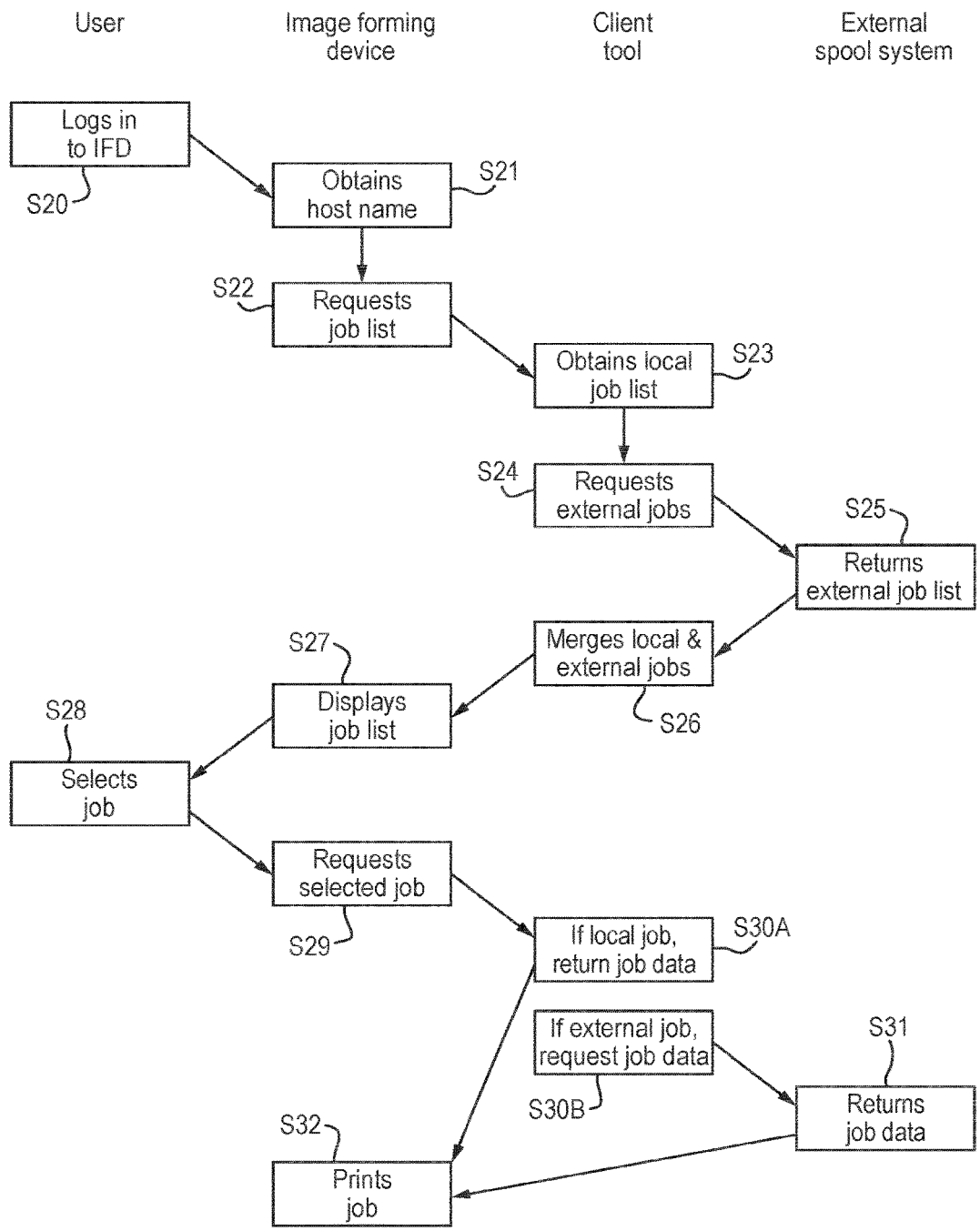
FIG. 5 is a flow chart of a process of an embodiment of the invention for printing print jobs from a queue.

As shown in FIG. 4, if the user wishes to print data from the external application executed by the external system, the user selects the data to be printed S10 and issues a print command by whatever means are supported by the external application. Any necessary authentication steps are performed by the external application, e.g. with reference to the authentication server 40. The external application outputs S11 the selected data to an external spool system forming part of the external system 200. The external spool system creates S12 and stores a print job 13 in its own print queue.

Referring again to FIGS. 2 and 5, to print a print job, the user proceeds to an image forming device 20 at which he or she wishes to obtain the print out and logs in S20 to that image forming device 20. Various different log-in methods can be provided. For example the user may log-in by entering a username and password or PIN on an input device, using a swipe card, smart card or RFID token, biometrics or any combination of such methods. The image forming apparatus 20 obtains S21 the address(es) and host name(s) of the user's PC(s) from the database server 50 or a local cache.

Image forming device 20 then requests S22 print job information from the user computer(s) whose address(es) were obtained. The request for the print job information may include the user ID and hashed password for authentication purposes. Job list manager 122 of client tool 100, in response to the request from image forming apparatus and having performed any necessary authentication, then obtains S23 a list of the user's local print jobs. The job list manager also sends a request for external print jobs to external spool system connector 130 of client tool 100.

Job information converter 133 converts the request for external print jobs into a format appropriate for the external service and passes it to external service connector 131. External service connector 131 sends the request S24 to the external spool service 200. The external service connector is provided with the address, e.g. URL and/or hostname, of the external service. The request sent to external spool service 200 may comply with an application programming interface (API) of the external service. A legacy application may not have a defined API, in which case the external service connector 131 may mimic user commands on a terminal application or browser normally used to communicate with the external system.

If the client tool is to connect to multiple external services, multiple external service connectors 131 may be provided or a single external service connector 131 may be configured to connect to multiple external services, e.g. if they have similar APIs. A request for a list of the user's print jobs is sent to each relevant external service.

Any user job lists returned S25 by the external service(s) are received by the external service connector 131 and passed to the job list manager 122. The job list manager 122 merges S26 the user's print jobs from the local print queue and from the external services into a single combined print job list. The combined print job list is then sent to image forming device 20. The job information returned by the external service is converted, as necessary, into the job list format expected by the image forming device.

In the combined print job list, the origin of the print jobs may be indicated in the name of the print job. For example the name of a print job may be in the form "[application]-[filename]", where [application] indicates a local application, such as Word™, or an external application, such as Oracle™. The job list manager may convert the names of print jobs contained in lists from an external service to a common format for inclusion in the combined print job list. In the event that the external service does not provide a name for a print job, the job list manager may create one, e.g. using the date and time of the print job and its origin.

Image forming device 20 displays S27 the combined print job list and allows the user to select S28 one or more print jobs to be printed at that time. Other functions, such as to save a print job to a later time or to delete a print job, can also be provided. The image forming device 20 sends S29 a request for the selected print job(s) 13 to the client tool 100 on the respective user computer(s) 11.

If the selected print jobs include any local print jobs, the job data manager 122 of the client tool 100 returns S30A the respective print data.

If the selected print jobs include any external print jobs, the job data requester 132 sends a request S30B for the respective job data to the relevant external service. The external spool service returns the respective print job data to the image forming apparatus 20. Alternatively, the external spool service can return the print job data or content to the client tool 100 which in turn forwards it to the image forming apparatus 20. This alternative approach may introduce a little delay but can be advantageous if the print job data provided by the external service requires format conversion before it can be printed or to allow advanced job editing and finishing functions not catered for by the external spool service. For example, the external service can return content in a document file format—e.g. .doc, .xls or .pdf—and the client tool converts this to a print job 13.

The print jobs received by the image forming apparatus 20 are printed as printed document(s) 30. If necessary, the print job is rendered by the image forming apparatus 20.

In an embodiment of the invention, the client tool on the user computer can be used to provide additional functionality. For example, the client tool may be capable of generating a preview image of part or all of a document to be printed. The client tool can be further configured to communicate a preview image to the image forming apparatus for the user to check before printing. Also, the client tool may apply rules based on the content of a document or meta-data. For example, a document containing prohibited content, e.g. predetermined words, can be prevented from printing. Similarly, a print job derived from a specific type of document, e.g. determined by the filename extension, can be prevented from printing.

When the print job has been sent to the image forming apparatus 20, the client tool 100 deletes it from the print queue 13. Generally the client tool does not wait to receive confirmation of successful printing before deleting the print job from the queue but that can be implemented as an alternative.

If it is desired to record usage information, the image forming apparatus 20 sends a usage message to database server 60 which records the user's usage. The usage message can be sent directly to database server 60 or via authentication server 40.

In the above described embodiment of the present invention, the client tool (print control program) is executed by a user computer. In an embodiment, the print control program is executed on a server computer shared by multiple users and maintains separate print queues for different users.

The present invention provides a number of advantages as compared to conventional systems. Firstly, user convenience is enhanced because the user only has to perform one logon process at the image forming device and sees all of his or her print jobs in a single job list. It is not necessary for the user to logon to several different applications on the image forming device and peruse several different print queues in order to see all of his or her print jobs. Secondly, the client tool uses existing functionality, e.g. a defined API, of the external system, and so does not require modification of the external system. Thirdly, the image forming device only needs to communicate to the print control program on the user computer and does not need to be provided with software to communicate with and register with multiple hosts of multiple external systems. Fourthly, information regarding printing from the external legacy system is easily integrated into the tracking of print jobs from other sources without modification to the external systems.

Having described specific embodiments of the present invention, it will be appreciated that variations and modifications of the above described embodiments can be made. The scope of the present invention is not to be limited by the above description but only by the terms of the appended claims.

What is claimed is:

1. A computer comprising a processor and a memory containing a program executable by the processor, the computer being connected to a network, which is also connected to an image forming device and an external system configured to generate external print jobs, the program including code being configured to:
    maintain a local print queue including local print jobs based on content generated by another computer program executed by the computer;
    receive a request for a job list from the image forming device;
    send a request for a list of the external print jobs to the external system;
    receive a list of the external print jobs from the external system;
    merge the list of the external print jobs with a list of the local print jobs in the local print queue to form a combined job list;
    send the combined job list to the image forming device;
    receive a request for print data of an external print job in the combined job list from the image forming device; and
    send a request for the print data of the external print job to the external system, the request directing the external system to return the print data to the computer.

2. The computer according to claim 1 wherein the computer is a user computer.

3. The computer according to claim 1 wherein the computer is a server computer.

4. A print control method for use in a networked system comprising a computer, an image forming device and an external system configured to generate external print jobs, the method comprising:
    the computer maintaining a local print queue including local print jobs based on content generated by another computer program executed by the computer;
    the image forming device sending a request for a job list to the computer;
    the computer sending a request for a list of the external print jobs to the external system;
    the external system sending a list of the external print jobs to the computer;
    the computer merging the list of the external print jobs with a list of the local print jobs in the local print queue to form a combined job list;
    the computer sending the combined job list to the image forming device;
    the computer receiving a request for print data of an external print job in the combined job list from the image forming device; and
    the computer sending a request for the print data of the external print job to the external system, the request directing the external system to return the print data to the computer.

5. A networked system comprising a computer, an image forming device and an external system configured to generate external print jobs, wherein the computer, image forming device and external system are configured to perform respective steps of the method of claim 4.

6. The networked system according to claim 5 wherein the method further comprises the image forming device displaying the combined job list to a user.

7. The networked system according to claim 6 wherein the method further comprises the image forming device receiving a user selection of a job from the combined job list and sending a request for the print data of the selected job to the computer.

8. A computer comprising a processor and a memory containing a program executable by the processor, the computer being connected to a network, which is also connected to plural external systems, each external system configured to generate external print jobs, the program including code being configured to:
    receive a request for a job list from an image forming device;
    send a request for a list of the external print jobs to each of the external systems;
    receive respective lists of the external print jobs from each of the external systems;
    merge the respective lists of the external print jobs to form a combined job list;
    send the combined job list to the image forming device;
    receive a request for print data of an external print job in the combined job list from the image forming device; and
    send a request for the print data of the external print job to an external system corresponding to the requested print data, the request directing the external system to return the print data to the computer.

* * * * *